(12) United States Patent
Diggle, III et al.

(10) Patent No.: US 7,055,785 B1
(45) Date of Patent: Jun. 6, 2006

(54) WIRE CARRIER APPARATUS AND SYSTEMS FOR SUPPORTING OBJECTS FOR WORK PERFORMED ON ELEVATED STRUCTURES

(75) Inventors: Frederick James Diggle, III, Birmingham, AL (US); Daniel R. Cheshire, Trafford, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 396 days.

(21) Appl. No.: 10/645,950

(22) Filed: Aug. 22, 2003

(51) Int. Cl.
*F16L 3/08* (2006.01)

(52) U.S. Cl. .................................. 248/74.3; 24/16 PB
(58) Field of Classification Search ............... 248/74.3, 248/60; 24/16 PB, 30.5 P, 16 R, 17 AP, 17 A, 24/3.5 R, 3.5 P, 442, 306
See application file for complete search history.

(56) References Cited

U.S. PATENT DOCUMENTS

| 800,050 | A | * | 9/1905 | Ayres | 24/129 A |
|---|---|---|---|---|---|
| 1,479,150 | A | * | 1/1924 | Mellus | 2/314 |
| 2,440,469 | A | * | 4/1948 | Goddard | 248/68.1 |
| 3,144,695 | A | * | 8/1964 | Budwig | 248/60 |
| 3,289,983 | A | * | 12/1966 | Mennerdahl | 248/60 |
| 3,791,663 | A | * | 2/1974 | Allsop et al. | 280/637 |
| 4,441,233 | A | * | 4/1984 | Swift | 24/16 PB |
| 4,765,037 | A | * | 8/1988 | Perry | 24/301 |
| D310,716 | S | * | 9/1990 | Trask | D24/195 |
| 4,990,157 | A | * | 2/1991 | Roberts et al. | 606/234 |
| 5,042,113 | A | * | 8/1991 | Severson et al. | 24/16 PB |
| 5,150,504 | A | * | 9/1992 | Cohen | 24/302 |
| 6,073,315 | A | * | 6/2000 | Rasmussen | 24/16 PB |

OTHER PUBLICATIONS

Carrier Handline B 0A07710, Apparatus Equipment and Tools, BellSouth Products Catalog, Jan. 2003, p. 141.

* cited by examiner

Primary Examiner—Korie Chan

(57) ABSTRACT

In one embodiment, a wire carrier structured to support at least a portion of at least one supported object is provided. The wire carrier includes an elongated strap having a proximate end and a distal end, the distal end of the elongated strap having a plurality of calibrated holes formed therein; a button formed in a portion of the elongated strap; and, each of the calibrated holes being structured for receiving the button therein in an operative association of the calibrated hole with the button to form an enclosure portion of the elongated strap, the enclosure portion being structured for supporting the supported object therein.

11 Claims, 3 Drawing Sheets

WIRE CARRIER APPARATUS AND SYSTEMS FOR SUPPORTING OBJECTS FOR WORK PERFORMED ON ELEVATED STRUCTURES

BACKGROUND

In many commercial and industrial settings, work sites at which work is performed may be associated with utility structures or other elevated structures. Scaling such elevated structures is often required by workers performing maintenance, installation and/or other related functions on equipment located at such elevated work sites. In elevated work environments, it may be difficult for workers to manipulate work tools and perform work on equipment at the work site, while also maintaining a reasonably stable physical position on a utility pole, for example, or another elevated structure associated with the work site.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting intensive training programs and/or providing workers with a variety of support devices, support systems, backup devices and systems, and/or other means that promote the stability and safety of workers in elevated environments. Despite the best efforts of an organization to enhance the safety of its workers and reduce the risks presented by tools, work materials, or other objects potentially descending from elevated structures, for example, it is nonetheless difficult to eliminate all risks to workers performing work on such elevated structures.

Many conventional line or wire carriers, for example, do not successfully balance the need for a worker to ascend an elevated structure to perform work with a certain amount/weight of a supported object such as an amount/weight of wire, for example, against the need to promote safety of the worker using the supported object in association with the work performed. What are needed, therefore, are apparatus and systems for promoting safe and effective work functions for workers using supported objects such as wire, for example, on elevated utility structures. Such apparatus and systems may be beneficial in addition to the myriad existing support systems, methods, devices and/or other apparatus employed by workers on elevated structures to reduce or mitigate risks associated with objects potentially descending from utility structures, for example.

SUMMARY

In one embodiment of the present embodiments, a wire carrier structured to support at least a portion of at least one supported object is provided. The wire carrier includes an elongated strap having a proximate end and a distal end, the distal end of the elongated strap having a plurality of calibrated holes formed therein; a button formed in a portion of the elongated strap; and, each of the calibrated holes being structured for receiving the button therein for promoting an operative association of the calibrated hole with the button to form an enclosure portion of the elongated strap, the enclosure portion being structured for supporting the supported object therein.

In another embodiment of the present embodiments, a wire carrier structured to support at least a portion of at least one supported object is provided. The wire carrier includes an elongated strap having a proximate end and a distal end, the distal end of the elongated strap having a snap button formed therein; a snap button receptacle formed in a portion of the elongated strap; and, the snap button receptacle being structured for receiving the snap button therein for promoting an operative association of the snap button receptacle with the snap button to form an enclosure portion of the elongated strap, the enclosure portion being structured for supporting the supported object therein.

In another embodiment of the present embodiments, a wire carrier structured to support at least a portion of at least one supported object is provided. The wire carrier includes an elongated strap having a proximate end and a distal end, the distal end of the elongated strap having a plurality of calibrated holes formed therein, wherein at least one dimension of at least one of the calibrated holes is a function of a characteristic of the supported object; a button formed in a portion of the elongated strap; each of the calibrated holes being structured for receiving the button therein for promoting an operative association of the calibrated hole with the button to form an enclosure portion of the elongated strap, the enclosure portion being structured for supporting the supported object therein, wherein the operative association of the button and the calibrated hole is configured for release of the operative association upon exertion of a predetermined level of force on the enclosure portion of the elongated strap; and, at least one slit formed adjacent to a circumference of at least one of the calibrated holes, wherein at least one dimension of at least one of the slits is a function of a characteristic of the supported object.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

FIG. 1A includes an enlarged schematic view of certain aspects of the example embodiment of a wire carrier shown in FIG. 1;

DESCRIPTION

As used herein, the term "utility structure" includes, for example and without limitation, telephone poles and other structures supporting utility related equipment and services such as, for example, telephone services, Internet services, electricity services and/or television/cable services; scaffolding; radio towers; oil rigs; buildings; construction sites for buildings and other related erections; structures that require elevation of a worker, and/or any other structures suitable for use in association with one or more of the various embodiments discussed herein.

As used herein, the term "wire" includes, for example and without limitation, and where applicable and suitable for use with one or more of the various embodiments disclosed herein, metal wire (e.g., copper wire), telephone line, fiber optic cable, telecommunications cable, electrical transmission/distribution lines, lines for promoting support of elevated structures, guide wires, and/or any other type of wire suitable for application to one or more of the present embodiments.

As used herein, the term "supported object" includes any object or combination of objects capable of being supported by the various embodiments disclosed herein. One example of a supported object includes, for example and without limitation, an amount or quantity of wire, such as a length of wire, for example.

As used herein, the term "button" includes the ordinary definition of "button" as understood by those skilled in the art in view of various aspects of the present embodiments. In addition, the term "button" can include any protrusion suitable for use in accordance with various aspects of the present embodiments.

Figure 1:
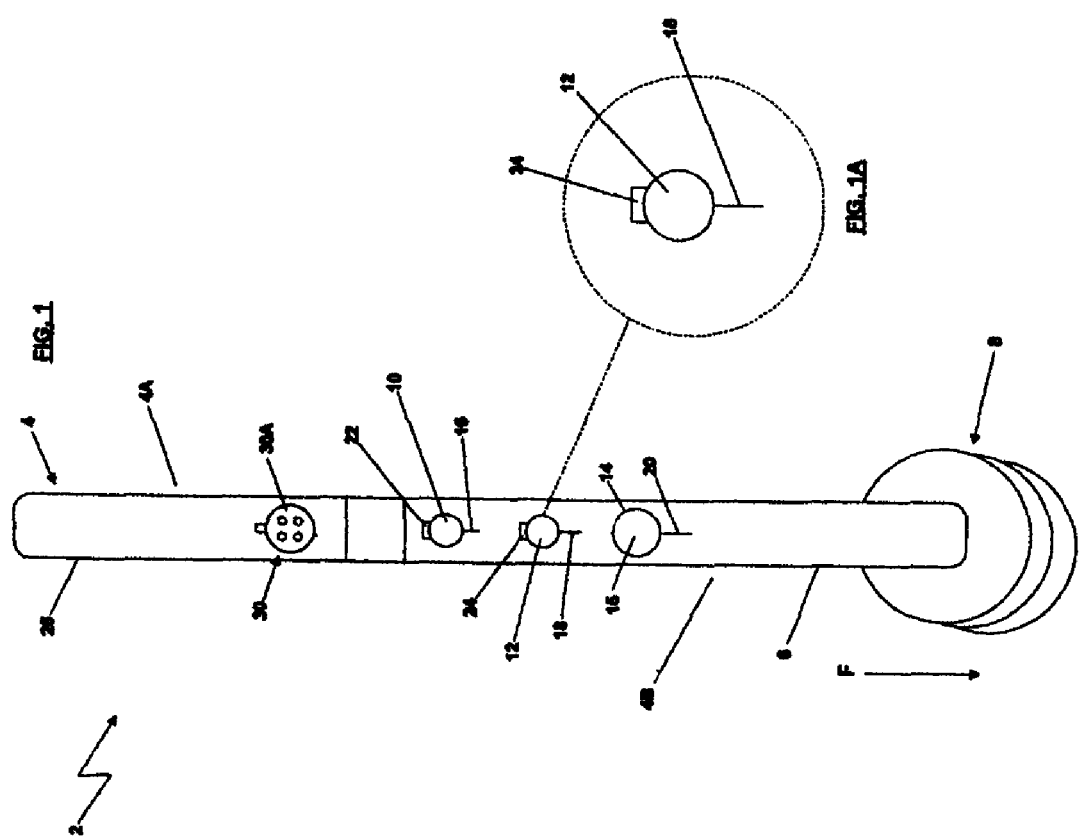
FIG. 1 includes a front schematic view of one example embodiment of a wire carrier provided in accordance with various aspects of the present embodiments.
Figure 2:
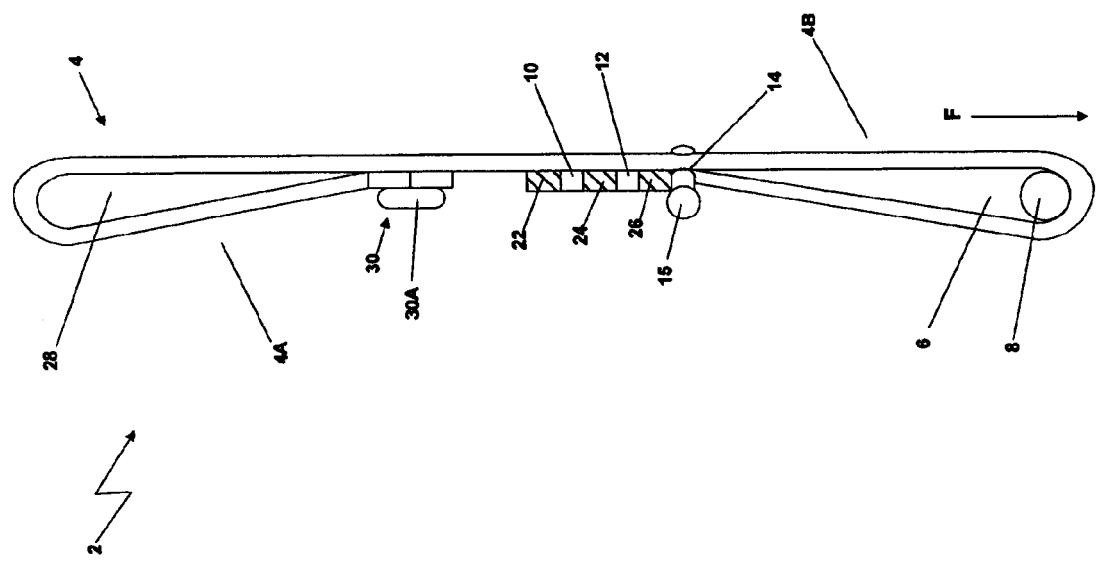
FIG. 2 includes a side view of an example embodiment of a wire carrier provided in accordance with various aspects of the present embodiments; and, FIG. 3 includes a side schematic view of one example embodiment of a wire carrier provided in accordance with various aspects of the present embodiments.

Referring now to FIGS. 1 through 2, in various example embodiments of the present embodiments, a wire carrier 2 is provided including an elongated strap 4 having a proximate end 4A and a distal end 4B. In various embodiments, the strap 4 can be comprised of a material such as, for example and without limitation, leather, metal, rubber, PVC plastic, and/or another material or combination of materials suitable for use in accordance with practice of various aspects of the present embodiments.

In various aspects of the present embodiments, the elongated strap 4 includes an enclosure portion 6 that can be configured/structured for maintaining therein at least a portion of a supported object 8, such as a portion of a type of wire as the supported object 8, for example, as shown. In other aspects, a portion of the distal end 4B of the strap 4 includes a plurality of holes formed therein, such as holes 10, 12, 14, for example, formed in the distal end 4B of the strap 4. In other aspects, each of the holes 10, 12, 14 is configured/structured to receive therein a support button such as the globe button 15, for example. In one aspect, the globe button 15 can be affixed (permanently, substantially permanently, and/or as a separate component) to a portion of the strap 4 located in a position of the strap 4 suitable for operative interaction of the globe button 15 with, in alternative aspects of the wire carrier 2, one or more of the holes 10, 12, 14. In one example of operation and use of the wire carrier 2, the globe button 15 is received into one of the holes 10, 12, 14 (such as by a service technician manually pressing one of the holes 10, 12, 14 against the globe button 15, for example) to form the enclosure portion 6 within the strap 4. As discussed above, in operation/use of the wire carrier 2, the enclosure portion 6 can be employed to receive and/or maintain therein at least a portion of a supported object such as wire, for example.

In other aspects of the present embodiments, one or more slits such as slits 16, 18, 20, for example, can be formed in the distal end 4B of the strap 4. As shown, the slits 16, 18, 20 can be each calibrated or otherwise configured/structured to extend from at least a portion of each circumference of the holes 10, 12, 14, respectively, as shown in FIG. 1. In one aspect of operation of the wire carrier 2, it can be appreciated that the supported object 8, by the nature of its dimensions and physical characteristics such as a weight of the supported object 8, for example, exerts a force F on the enclosure portion 6 of the strap 4. It can be seen that the force F transmits force to the area of operative association between the globe button 15 and the particular hole 10, 12, 14 into which the globe button 15 is received during a given mode of operation of the wire carrier 2.

In various aspects, the length, width, and/or another dimension of the slits 16, 18, 20 can be structured/configured as a function of the weight, for example, or another physical characteristic of the supported object 8. It can be appreciated that the dimensions of the slits 16, 18, 20, and/or the dimensions of the holes 10, 12, 14, can be structured/configured to release an operative association of the globe button 15 with a given one of the holes 10, 12, 14 when a predetermined amount of force is exerted on the enclosure portion 6 of the strap 4. In one example, force exerted on the enclosure portion 6 of the strap 4, and/or another portion or portions of the strap 4, may be an unexpected or undesired force that may affect the safety or stability of a service technician, for example, employing the wire carrier 2 for work on an elevated structure such as a utility structure, for example.

In other aspects of the present embodiments, one or more bearings such as bearings 22, 24, 26, for example, can be positioned in the distal end 4B of the strap 4 adjacent to at least a portion of the respective circumferences of each of the holes 10, 12, 14. The bearings 22, 24, 26 can be comprised of a suitable material such as metal (e.g., brass, steel, aluminum, and/or other metals); plastic such as PVC plastic; leather; and/or another material or combination of materials suitable for promoting retention of the globe button 15 in a given one of the holes 10, 12, 14, during function of the wire carrier 2 for supporting the supported object 8, or portion thereof, within the enclosure portion 6 of the strap 4.

It can be appreciated that factors such as the following, for example and without limitation, alone or in combination: amount, quantity, weight and/or another characteristic of the supported object 8; diameter of a selected one of the holes 10, 12, 14; and/or one or more dimensions of the slits 16, 18, 20, may be considered, among other factors, in determining a range of acceptable force that can be exerted on the enclosure portion 6, and/or another portion or portions, of the strap 4. It can be further appreciated that a length of wire, for example, used in connection with an elevated structure such as a utility structure, for example, can have a weight that varies in direct relationship with a height of the utility structure. In operational use of the wire carrier 2 by a service technician, for example, wire carried and extended from a surface elevation to a work site elevation on the utility structure possesses weight that is a function of the height of the utility structure. It can be seen that the length and weight of the supported object 8, as may be defined as a function of the height of a utility structure, for example, can be considered in deciding on selection of an appropriate operative association between the globe button 15 and a selected one of the holes 10, 12, 14.

It can be seen that various embodiments of the wire carrier 2 can be configured/structured to account for the force exerted by the weight of the supported object 8, for example, to promote the safety of a service technician, for example, carrying the supported object 8, while allowing an effective quantity of the supported object 8 to be carried by the service technician for performing desired work functions. In one example aspect, by providing for release of the operative association of the globe button 15 and a selected one of the holes 10, 12, 14, as a consequence of exertion of a predetermined level of undesirable force, thereby releasing the supported object 8 from the enclosure portion 6 of the wire carrier 2, the safety or stability of a service technician, for example, may be promoted in the event that the supported object 8 is unexpectedly affected by force, for example. In another example aspect, by providing for retention of the operative association of the globe button 15 and a selected one of the holes 10, 12, 14, despite exertion up to a predetermined level of force on the wire carrier 2, or portions thereof, support of the supported object 8 by the wire carrier 2 can be maintained/promoted. It can be seen that maintaining the supported object 8 within an acceptable range of exertion of force may reduce the possibility of unintentional or premature occurrences of releasing the supported object 8, for example, which may also improve the efficiency and/or effectiveness of a service technician, for example, using the supported object 8 for work related functions on an elevated structure such as a utility structure, for example.

In other aspects, the strap 4 includes a connection portion 28 suitable for operatively associating the wire carrier 2 with an object or structure such as the utility belt of a service technician, for example (not shown). As shown, the connection portion 28 is formed through securement of at least a portion of the proximate end 4A of the strap 4 to another portion of the strap 4. In one aspect, securement of the portion of the proximate end 4A of the strap 4 to another portion of the strap 4 can be effected by use of a redundant release system 30 structured/configured for fastening the portion of the proximate end 4A of the strap 4 to another portion of the strap 4. In one embodiment, the redundant release system 30 includes a release button 30A having at least one hole formed therein, wherein the hole or holes are structured to receive at least one thread therethrough to provide a threaded connection of the release button 30A to a connection location of the strap 4 through the proximate end 4A of the strap 4. In one aspect of an example operation, the release button 30A (and, more generally, the redundant release system 30) may serve as a backup means for releasing the strap 4 from the object or structure, or portion thereof, surrounded by the connection portion 28, in the event that the wire carrier 2 experiences an unexpectedly exerted level of force, for example, in addition to the existing force F which is a consequence of the weight, for example, or another physical dimension or characteristic of the supported object 8.

Figure 3:
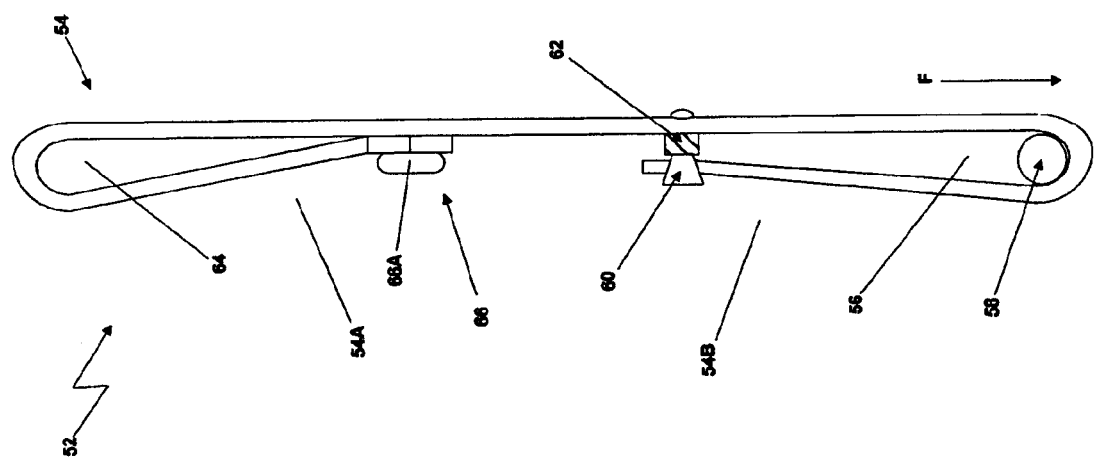

Referring now to FIG. 3, in another example embodiment of the present embodiments, a wire carrier 52 is provided including an elongated strap 54 having a proximate end 54A and a distal end 54B. In various embodiments, the strap 54 can be comprised of a material such as, for example and without limitation, leather, metal, rubber, PVC plastic, and/or another material or combination of materials suitable for use in accordance with practice of various aspects of the present embodiments. In various aspects of the present embodiments, the elongated strap 54 includes an enclosure portion 56 that can be configured/structured for maintaining therein at least a portion of a supported object 58, such as a portion of a type of wire, for example.

In various aspects of the present embodiments, the distal end 54B of the strap 54 can include a snap button 60 formed therein. In addition, in various aspects, a portion of the strap 54 can include a snap button receptacle 62 formed therein. In an example operation to support the supported object 58, the snap button 60 can be pressed into the snap button receptacle 62 (such as by manual manipulation performed by a service technician, for example) to operatively associate the snap button 60 with the snap button receptacle 62 and thereby form the enclosure portion 56 of the strap 54 for supporting/maintaining the supported object 58 therein. It can be appreciated that the configuration/structure of the snap button 60 and/or the snap button receptacle 62 can be designed to release an operative association of the snap button 60 with the snap button receptacle 62 upon exertion of an undesired level of force upon the enclosure portion 56, and/or another portion or portions, of the wire carrier 52.

In another aspect, the strap 54 can include a connection portion 64 suitable for operatively associating the wire carrier 52 with an object or structure such as the utility belt of a service technician, for example (not shown). As shown, the connection portion 64 is formed through securement of at least a portion of the proximate end 54A of the strap 54 to another portion of the strap 54. In one aspect, securement of the portion of the proximate end 54A of the strap 54 to another portion of the strap 54 can be effected by use of a redundant release system 66 structured/configured for fastening the portion of the proximate end 54A of the strap 54 to another portion of the strap 54. In one embodiment, the redundant release system 66 includes a release button 66A having at least one hole formed therein, wherein the holes are structured to receive at least one thread therethrough to provide a threaded connection of the release button 66A to a connection location of the strap 54 through the proximate end 54A of the strap 54. In one aspect of an example operation, the release button 66A may serve as a backup means for releasing the strap 54 from the object or structure, or portion thereof, surrounded by the connection portion 64, in the event that the wire carrier 52 experiences an unexpected level of exerted force, for example, in addition to the existing force F which is a consequence of the weight, for example, or another physical dimension or characteristic of the supported object 58.

It can be appreciated that choice of materials for construction/manufacture of the various structural elements disclosed herein is driven, at least in part, by the motivation to provide system and apparatus embodiments that are relatively lightweight, relatively compact, readily manipulated and structurally sound. It can be further appreciated that such materials can be selected to promote convenience of transportation and manipulation of the various aspects and components of the present embodiments in association with work performed on elevated structures, for example.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular inflatable device, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. Because such elements are well known in the art, however, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A wire carrier structured to support at least a portion of at least one supported object, said wire carrier comprising:

an elongated strap having a proximate end and a distal end, said distal end of said elongated strap having a plurality of holes formed therein;

each of said plurality of holes having at least one calibrated slit formed adjacent to a circumference thereof, each said calibrated slit being calibrated by having at least one dimension selected as a function of at least one physical characteristic of a selected said supported object, each said calibrated slit having a length dimension different in comparison to a length dimension of any other of said calibrated slits;

a button formed in a portion of said elongated strap; and, each said hole and its associated calibrated slit being structured for receiving said button therein for promoting operative association of said hole with said button to form an enclosure portion of said elongated strap, said enclosure portion being structured for supporting said supported object therein.

2. The wire carrier of claim 1, wherein said physical characteristic of said supported object includes a physical characteristic selected from the group consisting of a weight, a length, and a quantity.

3. The wire carrier of claim 1, wherein at least one dimension of at least one of said plurality of holes is a function of a physical characteristic of said supported object.

4. The wire carrier of claim 1, wherein said button includes a globe button.

5. The wire carrier of claim 1, wherein said operative association of said button with each of said plurality of holes and each said calibrated slit is configured for release upon exertion of a predetermined level of force on at least one portion of said elongated strap.

6. The wire carrier of claim 5, wherein said configured operative association of said button with each said hole and its associated calibrated slit is a function of a weight of said supported object.

7. The wire carrier of claim 1, further comprising a connection portion formed by connection of said proximate end of said elongated strap to a portion of said elongated strap.

8. The wire carrier of claim 7, further comprising a redundant release system operatively associated with said proximate end of said elongated strap.

9. The wire carrier of claim 8, wherein said redundant release system includes a release button threadedly attaching said proximate end of said elongated strap to said portion of said elongated strap.

10. The wire carrier of claim 1, further comprising at least one bearing positioned adjacent to at least a portion of a circumference of at least one of said plurality of holes.

11. The wire carrier of claim 1, wherein said supported object includes at least one type of wire.

* * * * *